US009476413B2

(12) United States Patent
Lorand

(10) Patent No.: US 9,476,413 B2
(45) Date of Patent: Oct. 25, 2016

(54) ELECTRIC PROPULSION SYSTEM WITH STATIONARY PLASMA THRUSTERS

(75) Inventor: Anthony Claude Bernard Lorand, Notre Dame de l'Isle (FR)

(73) Assignee: SNECMA, Paris (FR)

( * ) Notice: Subject to any disclaimer, the term of this patent is extended or adjusted under 35 U.S.C. 154(b) by 134 days.

(21) Appl. No.: 14/343,951

(22) PCT Filed: Aug. 3, 2012

(86) PCT No.: PCT/FR2012/051845
§ 371 (c)(1),
(2), (4) Date: Mar. 10, 2014

(87) PCT Pub. No.: WO2013/034825
PCT Pub. Date: Mar. 14, 2013

(65) Prior Publication Data
US 2014/0208713 A1    Jul. 31, 2014

(30) Foreign Application Priority Data
Sep. 9, 2011  (FR) ..................... 11 58047

(51) Int. Cl.
| F03H 1/00 | (2006.01) |
| B64G 1/00 | (2006.01) |
| B64G 1/24 | (2006.01) |
| B64G 1/40 | (2006.01) |
| B64G 1/42 | (2006.01) |

(52) U.S. Cl.
CPC ............ *F03H 1/0037* (2013.01); *B64G 1/405* (2013.01); *B64G 1/428* (2013.01); *F03H 1/0012* (2013.01); *F03H 1/0018* (2013.01); *F03H 1/0075* (2013.01); *B64G 1/007* (2013.01); *B64G 1/242* (2013.01)

(58) Field of Classification Search
CPC .. F03H 1/0018; F03H 1/0012; F03H 1/0075; B64G 1/428
See application file for complete search history.

(56) References Cited

U.S. PATENT DOCUMENTS

| 5,339,623 A | 8/1994 | Smith |
| 5,947,421 A | 9/1999 | Beattie et al. |

(Continued)

FOREIGN PATENT DOCUMENTS

| EP | 0 550 250 | 7/1993 |
| FR | 2 788 084 | 7/2000 |

OTHER PUBLICATIONS

Gray, "Inmarsat 4F1 Plasma Propulsion System Initial Flight Operations", Nov. 2005.*

(Continued)

*Primary Examiner* — Phutthiwat Wongwian
*Assistant Examiner* — William Breazeal
(74) *Attorney, Agent, or Firm* — Oblon, McClelland, Maier & Neustadt, L.L.P.

(57) ABSTRACT

An electric propulsion system includes a first stationary plasma thruster including a single first cathode, a first anode, and a first gas manifold, and a second stationary plasma thruster including a single second cathode, a second anode, and a second gas manifold. The system further includes an electrical connection device common to the first and second cathodes, first and second gas flow rate control devices with a common fluid flow device for feeding gas, and a selective control device for activating at any given instant only one of the first and second cathodes in co-operation with one or the other of the first and second anodes.

21 Claims, 10 Drawing Sheets

(56) References Cited

U.S. PATENT DOCUMENTS

| | | | |
|---|---|---|---|
| 6,279,314 B1* | 8/2001 | Valentian | F03H 1/0075 60/202 |
| 2011/0073714 A1* | 3/2011 | Hruby | B64G 1/405 244/171.1 |

OTHER PUBLICATIONS

Duchemin, "Multi-Channel Hall-Effect Thrusters:Mission Applications and Architecture Trade-Offs", Sep. 2007.*

Duchemin, O. et al., "Multi-Channel Hall-Effect Thrusters: Mission Applications and Architecture Trade-Offs", IEPC-2007-227, The $30^{th}$ International Electric Propulsion Conference, Florence, Italy, pp. 1-15, (Sep. 17-20, 2007) XP055026701.

International Search Report Issued Nov. 30, 2012 in PCT/FR12/051845 Filed Aug. 3, 2012.

* cited by examiner

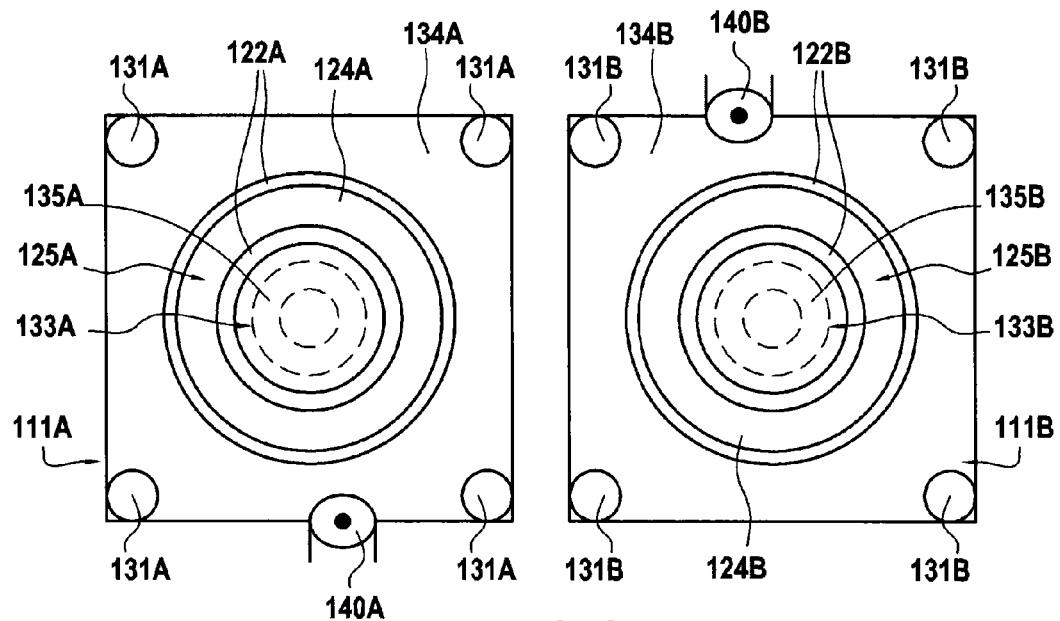
FIG.1
FIG.2
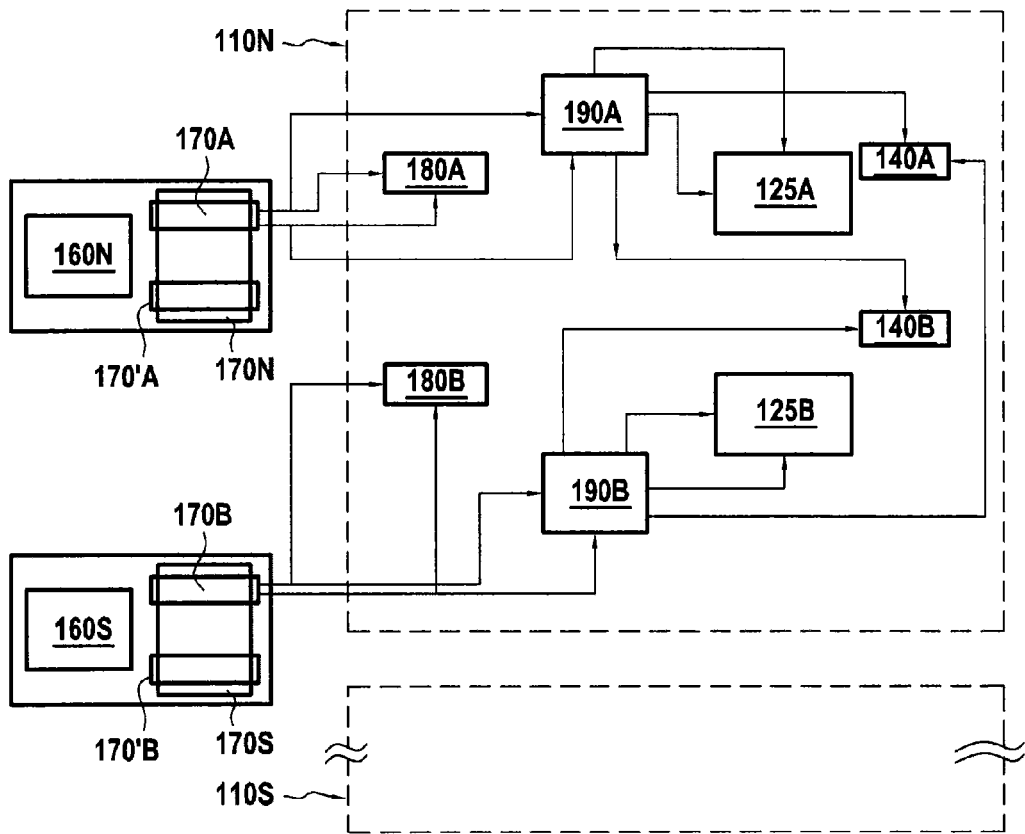

ELECTRIC PROPULSION SYSTEM WITH STATIONARY PLASMA THRUSTERS

FIELD OF THE INVENTION

The present invention relates to an electric propulsion system with stationary plasma thrusters, also known as Hall effect thrusters.

PRIOR ART

Electric propulsion systems are generally used for fitting to satellites, in particular geostationary satellites, and they are used in particular for controlling orbit. Electrical thrusters may also be used for performing orbit transfer maneuvers.

For questions of reliability, an electric propulsion system has redundant equipment. Nevertheless, the high cost of stationary plasma thrusters is a brake on their development as equipment for satellites.

There therefore exists a need to simplify the architecture of such electric propulsion systems, and to reduce their mass, while maintaining a satisfactory level of redundancy and reliability, and while remaining compatible with existing interfaces with the satellites that are to be fitted with such propulsion systems.

FIG. 10 shows the basic structure of a Hall effect thruster 11 that essentially comprises an ionization and discharge channel 24 that is associated with an anode 25, and a cathode 40 arranged in the vicinity of the outlet from the ionization and discharge channel 24. The ionization and discharge channel 24 has walls 22 made of insulating material, such as a ceramic. A magnetic circuit 34 and electromagnet coils 31 surround the ionization and discharge channel 24. An inert gas such as xenon coming from a pipe 10 connected to a tank (not shown) is injected via a pipe 21 into the rear of the discharge channel 24 by means of a gas manifold 27 that is combined with the anode 25, and via a pipe 41 into the cathode 40. The inert gas is ionized in the ionization and discharge channel 24 by colliding with the electrons emitted by the cathode 40. The ions that are produced are accelerated and ejected by the axial electric field created between the anode 25 and the cathode 40. The magnetic circuit 34 and the electromagnet coils 31 create a magnetic field within the channel 24, which field is essentially radial.

FIG. 10 is a diagrammatic axial section view of an example Hall effect thruster of the closed electron drift type.

In FIG. 10, there can be seen an annular channel 24 defined by a part 22 made of insulating material, such as a dielectric ceramic, a magnetic circuit having outer and inner annular parts 34 and 35, a magnetic yoke arranged upstream from the thruster, and a central core connecting together the annular parts 34, 35 and the magnetic yoke. Outer and inner coils 31 and 33 serve to create a magnetic field in the annular channel 24. A hollow cathode 40 is coupled to a xenon feed device to form a plasma cloud in front of the downstream outlet of the channel 24. An anode 25 is arranged in the annular channel 24 and is associated with an annular manifold 27 for distributing ionizable gas (xenon). The thruster assembly may be protected by a housing. The cathode 40 may have heater elements 42, emitter elements 43, and initiator elements 44. The gas feed pipes 10, 21, and 41 are fitted with electrical insulator elements 12, 13. Respective electric cables 51, 52 connect the elements of the cathode 40, and the anode 25 and the coils 31, 33 to electrical power supply and control circuits that are not shown in FIG. 10.

Examples of Hall effect thrusters are described in particular in the following documents: FR 2 693 770 A1; FR 2 743 191 A1; FR 2 782 884 A1; and FR 2 788 084 A1.

Hall effect thrusters such as those described with reference to FIG. 10 may have a single cathode associated with the central anode and a single control circuit for controlling the rate at which the cathode is fed with xenon. The embodiment is then simplified and mass is reduced. Nevertheless, there is then no redundancy and reliability is not ensured in the event of a failure in the anode, the cathode, or a control circuit.

That is why proposals have been made to provide redundant electric propulsion systems using thruster pairs, each comprising two cathodes and two control circuits, as shown in FIGS. 11 and 12.

FIG. 11 is a face view of two identical Hall effect thrusters 11A, 11B that may be similar to the thruster 11 of FIG. 10, but each of them has two respective cathodes 40A1, 40A2 or 40B1, 40B2 and two circuits for controlling the rate at which xenon is fed to the cathodes (not shown in FIG. 11). In FIG. 11, the component elements of each thruster 11A, 11B are given the same references as in FIG. 10, but followed by the letter A for the thruster 11A and by the letter B for the thruster 11B. These component elements are therefore not described again.

FIG. 12 is a block diagram of control circuits for controlling the pair of thrusters 11A, 11B of FIG. 11, which by way of example are configured as constituting the north control channel in a set of two thruster pairs for north-south orbit control.

FIG. 12 shows a power processor unit (PPU) 60N for use firstly with the north control channel, and associated with an external thruster switch unit (ETSU) 70A. The north control channel of the ETSU 70A is connected firstly to each of the circuits 80A1, 80B1 for controlling the xenon feed rate associated with the normal cathodes 40A1, 40B1 of the first and second thrusters 11A, 11B, and secondly for an electrical filter unit 90A serving to feed electricity firstly to the anode 25A and secondly to the first and second cathodes 40A1, 40B1 of the first thruster 11A for the north control channel. A second PPU 60S is for use firstly with the south control channel, and it is associated with a second ETSU 70B. The north control channel of the ETSU 70B is connected firstly to each of the control circuits 80A2, 80B2 for controlling the xenon feed rate associated with the redundant cathodes 40A2, 40B2 of the first and second thrusters 11A, 11B, and secondly to an electrical filter unit 90B serving to feed electricity firstly to the anode 25A and secondly to the first and second cathodes 40A2, 40B2 of the second thruster 11B of the north control channel. The first and second PPUs 60N, 60S, the north control channels of the first and second ETSUs 70A, 70B, and the set 10N of elements as described above constitute an assembly that is fully redundant for the thrusters 11A, 11B of the north control channel, since all of the elements are duplicated. In similar manner, the first and second PPUs 60N, 60S, the south control channels of the first and second ETSUs 70A, 70B, and a set 10S of elements similar to the elements described above and not described again constitute an assembly that is fully redundant for the thrusters 11A, 11B of the south control channel, since all of the elements are duplicated.

Although the system described with reference to FIGS. 11 and 12 provides complete redundancy and thus great reliability, that system is expensive, heavy, and does not enable the architecture of the system to be simplified. Furthermore, it should be observed that when using stationary plasma thrusters, the discharge circuit referred to as the anode is connected to the circuit for extracting and neutralizing ions that is referred to as the cathode, such that it would appear, a priori, difficult to simplify an architecture such as that of the prior art system of FIGS. 11 and 12.

OBJECT AND BRIEF SUMMARY OF THE INVENTION

An object of the present invention is to remedy the above-mentioned drawbacks of prior electric propulsion systems using Hall effect thrusters, or closed electron drift plasma thrusters, so as to simplify the architecture of such systems and reduce their cost, while conserving reliability in the event of failure of any one of the components of the system.

These objects are achieved by an electric propulsion system with stationary plasma thrusters, the system comprising at least one device for regulated delivery of gas under high pressure; first and second power processor units (PPUs); first and second external thruster switch units (ETSUs); first and second electrical filters; and first and second juxtaposed stationary plasma thrusters; the first stationary plasma thruster comprising a first ionization channel, a single first cathode arranged in the vicinity of the outlet from the first ionization channel, a first anode associated with the first ionization channel, a first gas manifold, and first devices for creating a magnetic field around the first ionization channel, and the second stationary plasma thruster comprising a second ionization channel, a second single cathode arranged in the vicinity of the outlet from the second ionization channel, a second anode associated with the second ionization channel, a second gas manifold, and second devices for creating a magnetic field around the second ionization channel; the electric propulsion system being characterized in that it further comprises an electrical connection device common to the first and second cathodes; first and second gas flow rate control devices associated respectively with each of the first and second stationary plasma thrusters, with a common fluid flow device for feeding gas to the first and second anodes and to the first and second cathodes from said device for regulated delivery of gas under high pressure; and a device for selectively controlling the activation at any given instant of only one of said first and second cathodes in co-operation with one of said first and second anodes.

Such a system is simplified compared with a system having full redundancy, including two cathodes for each stationary plasma thruster (SPT), but reliability remains very high because of the presence of two anodes and because of the possibility of replacing a failed cathode of one SPT by the cathode of the other SPT, providing such co-operation is made possible by construction.

The system of the invention with electrical and fluid flow connection in common for the two cathodes of two different juxtaposed SPTs thus enables the configuration to be simplified compared with a system having two-cathode SPTs, while nevertheless enabling crossed operation of the cathodes in a manner that is close to full redundancy, insofar as the first SPT has a first anode A1 and a first cathode K1 while a second SPT has a second anode A2 and a second cathode K2, thus making it possible to use any one of the four operating configurations to guarantee operation even in the event of a failure in the operation of one or the other of the anodes A1 and A2, and at the same time a failure in the operation of one or other of the cathodes K1 and K2:

anode A1+cathode K1
anode A2+cathode K2
anode A1+cathode K2
anode A2+cathode K1

In a first particular embodiment, the common fluid flow device comprises a first branch having at least: a first controlled inlet valve; a first thermostriction element; and a first set of three secondary branches, each having a respective controlled valve and connected respectively to said first cathode, to said first anode, and to said second cathode; and a second branch having at least: a second controlled inlet valve; a second thermostriction element; and a second set of three secondary branches, each having a respective controlled valve, and connected respectively to said first cathode, to said second cathode, and to said second anode.

Under such circumstances, and advantageously, the first gas flow rate control device has coils for controlling the first controlled inlet valve, and selective controls for controlling respective controlled valves of the first set of three secondary branches, and the second gas flow rate control device has coils for controlling the second controlled inlet valve, and selective controls for controlling the respective controlled valves of the second set of three secondary branches.

In a second particular embodiment, the common fluid flow device comprises a first branch with at least: a first controlled inlet valve; a first thermostriction element; and a first set of first and second secondary branches, each having a respective controlled valve, the first secondary branch being connected to said first anode and the second secondary branch being connected firstly to said first cathode via a first additional controlled valve and secondly to said second cathode via a second additional controlled valve; and a second branch with at least: a second controlled inlet valve; a second thermostriction element; and a second set of first and second secondary branches, each having a respective controlled valve, the first secondary branch being connected to said second anode, and the second secondary branch being connected firstly to said first cathode via said first additional controlled valve and secondly to said second cathode via said second additional controlled valve.

Under such circumstances, and advantageously, the first gas flow rate control device has coils connected in parallel for simultaneously controlling the first controlled inlet valve, the controlled valve of the first secondary branch of the first branch, and the valve of said second secondary branch of the first branch, the second gas flow rate control device has coils connected in parallel for simultaneously controlling the second controlled inlet valve, the controlled valve of the first secondary branch of the second branch, and the controlled valve of the second secondary branch of the second branch, and the first and second gas flow rate control devices also have in common control coils for controlling said first and second additional controlled valves, one or the other of said first and second additional controlled valves being open at any given instant.

In a third possible embodiment, the common fluid flow device comprises a first branch with at least: a first controlled inlet valve; a first thermostriction element; and a first set of two secondary branches, each having a respective controlled valve and connected respectively to said first cathode and to said first anode; and a second branch with at least: a second controlled inlet valve; a second thermostriction element; and a second set of two secondary branches, each having a respective controlled valve and connected respectively to said second cathode and to said second anode.

Under such circumstances, and advantageously, the first gas flow rate control device has coils for respectively controlling the first controlled inlet valve and the respective controlled valves of the first set of two secondary branches, the second gas flow rate control device has coils for respectively controlling the second controlled inlet valve and the respective controlled valves of the second set of two secondary branches, and the first and second gas flow rate control devices are associated with a switch module for selectively controlling the power supply to said coils.

At least one filter may be associated with each controlled valve.

The system of the invention may also comprise third and fourth juxtaposed stationary plasma thrusters analogous to said first and second juxtaposed stationary plasma thrusters and co-operating with said at least one device for regulated delivery of gas under high pressure, said first and second PPUs, said first and second switch units, and said first and second electrical filters.

By way of example, it is thus possible to provide north-south control of a satellite with a remarkably high level of reliability, while using an architecture that is simpler and less expensive than the architecture of a set of four stationary plasma thrusters, each having two cathodes.

BRIEF DESCRIPTION OF THE DRAWINGS

Other characteristics and advantages of the invention appear from the following description of particular embodiments given as non-limiting examples and with reference to the accompanying drawings, in which:

FIG. 1 is a face view of a set of single-cathode stationary plasma thrusters suitable for being incorporated in an electric propulsion system of the invention;

FIG. 2 is a block diagram of a set of control and feed circuits associated with the set of stationary plasma thrusters in accordance with the invention;

DETAILED DESCRIPTION OF PARTICULAR EMBODIMENTS

Figure 10:
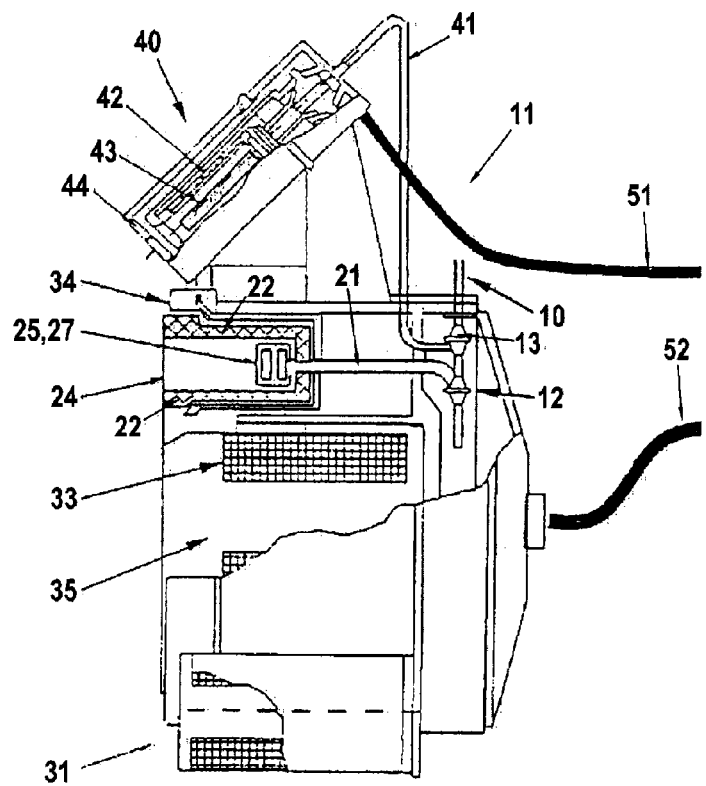
FIG. 10 is a diagrammatic section view of an example of a prior art stationary plasma thruster.
Figure 11:
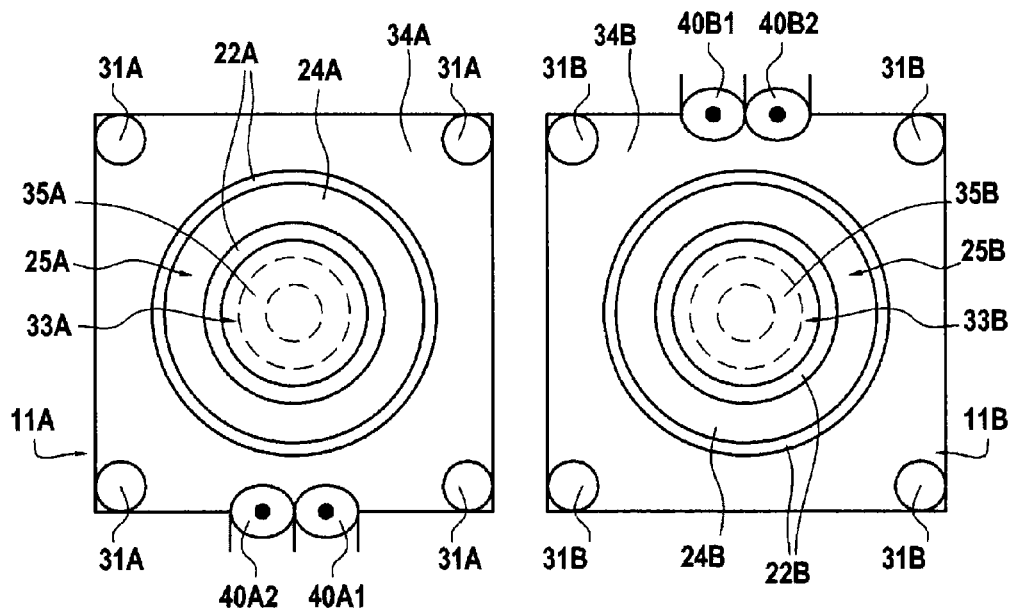
FIG. 11 is a face view of a set of prior art two-cathode stationary plasma thrusters suitable for incorporating in an electric propulsion system.
Figure 12:
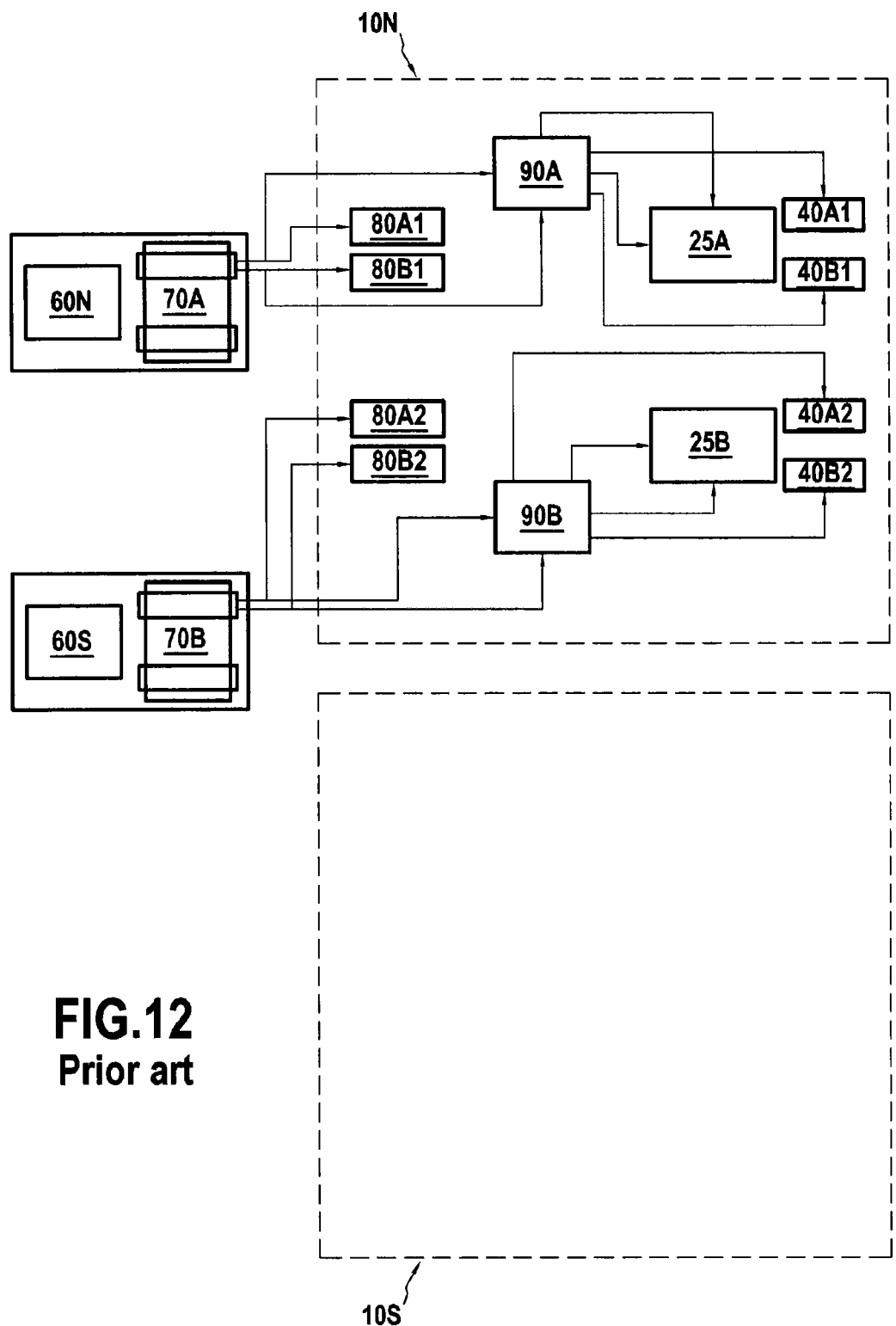
FIG. 12 is a block diagram of a fully redundant set of control and feed circuits associated with the prior art two-cathode stationary plasma thrusters of FIG. 11.

The invention uses Hall effect thrusters or stationary plasma thrusters (SPTs) having the same basic structure as that described above with reference to FIGS. 10 and 11, but that have only one cathode each, unlike those fully redundant prior art thrusters.

The invention is also applicable to electric thrusters of similar type, such as for example coaxial type staged plasma thrusters.

FIG. 1 is a face view of a set of two juxtaposed single-cathode stationary plasma thrusters 111A, 111B suitable for incorporating in an electric propulsion system of the invention.

In FIG. 1, there can be seen for each SPT 111A, 111B an annular channel 124A, 124B defined by a part 122A, 122B made of insulating material such as dielectric ceramic, a magnetic circuit having outer and inner annular parts 134A, 134B and 135A, 135B, a magnetic yoke being arranged upstream from the thruster and a central core connecting the magnetic yoke to the annular parts 134A, 135A or 134B, 135B, as the case may be. Outer and inner coils 131A, 131B and 133A, 133B serve to create a magnetic field in the annular channel 124A, 124B. In a variant, it is nevertheless possible for the magnetic field to be created in the annular channel with the help of permanent magnets. A hollow cathode 140A, 140B is coupled to a xenon feed device so as to form a plasma cloud in front of the downstream outlet from the channel 124A, 124B. An anode 125A, 125B is arranged in the annular channel 124A, 124B and is associated with an annular manifold for distributing ionizable gas (xenon). The thruster assembly may be protected by a housing.

The cathode 140A, 140B may include heater, emitter, and initiator elements. The gas feed pipes are fitted with electrical insulation elements. Respective electric cables connect the elements of the cathode 140A, 140B, and the anode 125A, 125B, and also the coils 131A, 131B and 133A, 133B to electrical power supply and control circuits that are not shown in FIG. 1.

FIG. 2 is a block diagram of the general architecture of an electric propulsion system of the invention with its control modules.

A first main power processor unit (PPU) 160N is associated with a pair of juxtaposed stationary plasma thrusters 111A, 111B, such as those shown in FIG. 1, and may serve for example to control north-south orientation of a satellite. The PPU 160N is associated with an external thruster switch unit (ETSU) 170N that comprises a north control channel switch unit 170A and a south control channel switch unit 170'A for switching between a set 110N constituting a north control channel and an identical set 110S constituting a south control channel.

In similar manner, a second PPU 160S is associated with another pair of juxtaposed stationary plasma thrusters analogous to those shown in FIG. 1, and may likewise serve for example to control north-south orientation of a satellite. The PPU 160S is associated with an ETSU 170S that has a north control channel switch unit 170B and a south control channel switch unit 170'B for switching between the set 110N constituting a north control channel and an identical set 110S constituting a south control channel.

The presence of two PPUs 160N and 160S provides redundancy in the control circuit.

In the description below, attention is given essentially to the component elements of a first channel, such as the north control channel 110N, the component elements of the second channel, the south control channel 110S, being identical.

FIG. 2 shows that the north switch unit 170A of the ETSU switch 170N serves to connect the first PPU 160N to an electrical filter 190A, and to power the coils 131A, 133A for creating a magnetic field around an ionization and discharge channel 124A of the first SPT 111A, and the anode 125A of the cathode 140A of the first SPT 111A. Furthermore, a connection via the north control channel switch unit 170A of the ETSU 170N between the PPU 160N and the device 180A for controlling the gas flow rate of the first SPT 111A serve to control the device 180A.

The PPU 160N receives electricity produced by an external source, such as solar panels, and converts this electricity which may typically be delivered at a voltage of 50 V or 100 V, into electricity at higher voltage, of the order of several hundreds of volts.

The PPU 160N comprises in particular circuits for generating an analog control signal that is applied to the gas flow rate control device 180A.

The PPU 160N receives data delivered by a control circuit associated with a module (not shown) for regulating the gas pressure delivered to the gas flow rate control device 180A from a gas tank (not shown).

The tank of ionizable gas, such as xenon, is thus connected to the pressure regulator module, which is itself connected to the gas flow rate control device 180A serving via hoses to feed respectively the cathode 140A and the gas manifold combined with the anode 125A within the discharge channel.

A control circuit associated with the PPU 160N receives information concerning sensors and the states of valves in the gas pressure regulator module and receives external data. The data transmitted by the control circuit to the PPU 160N makes it possible to generate the analog control signal that is applied to the gas flow rate control device 180A.

In general, the PPU 160N is constituted by electric circuits serving firstly to provide a low power feed to the gas flow rate control device 180A and secondly a high power feed to the electromagnet coils 131A, 133A, to the cathode 140A, and to the anode 125A, and, in selective manner via a cross connection, to the cathode 140B of the redundant SPT 111B, in accordance with an important characteristic of the present invention.

The PPU 160S is similar to the PPU 160N. The north control channel switch unit 170B of the ETSU 170S serves to power the elements of the redundant SPT 111B, namely the gas flow rate control device 180B and the feed coils 131B, 133B, and via the electrical filter 190B, the anode 125B, and the cathode 140B, and in selective manner, via a cross connection the cathode 140A of the nominal SPT 111, thus likewise constituting an important characteristic of the present invention.

Figure 3:
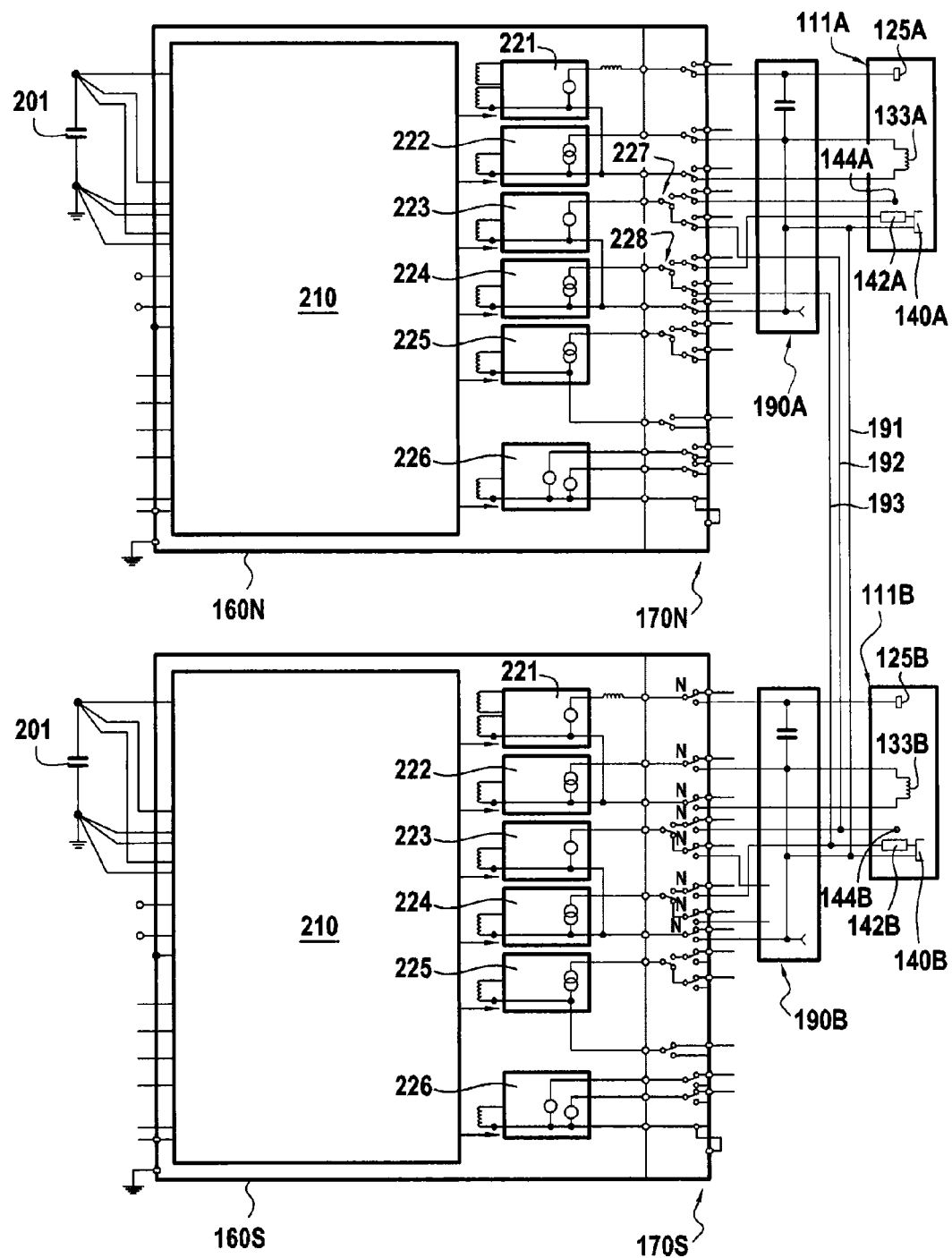
FIG. 3 is a block diagram of a portion of the control and feed circuits of FIG. 2, showing a crossed electrical connection of the cathodes of the set of single-cathode stationary plasma thrusters.

FIG. 3 shows in greater detail an example embodiment of the PPUs 160N, 160S with the switch units 170N, 170S and electrical filters 190A, 190B, and the crossed electrical connection lines of the two cathodes 140A, 140B enabling only one of the two cathodes to be activated at a time.

The PPU 160N shown in FIG. 3 comprises an input capacitor 201 for applying an input voltage to a converter circuit 210 that may comprise inverters respectively feeding the primaries of transformers 213A, 213B. The secondaries of the transformer 213A are connected to a power supply module 221 for the anode 125A and to a power supply module 222 for the electromagnet coil 133A. The secondaries of the transformer 213B are connected to the power supply module for the anode 125A, to the initiator module 223 of the cathode 140A, and to the heater module 224 of the cathode 140A.

The input voltage is also applied to a direct current-direct current (DC-DC) converter feeding the primary of a DC-DC transformer 212 having its secondaries connected to a control module 225 for controlling a thermostriction element and to a control module 226 for controlling solenoid valves.

The converter 210 may also comprise a sequencer device for selectively controlling the operation of the modules 221 to 226.

The converter 210 may also comprise various interfaces for remote measurement and remote control.

In general, the PPU 160N (and in similar manner the PPU 160S) performs the functions of powering the discharge (anode-cathode voltage of an SPT), powering the electromagnet coils present in the SPT, initiating and where applicable heating the cathode, and also performing auxiliary power supply functions for the gas feed solenoid valves and the thermostriction members.

The PPU 160N (or 160S) also incorporates in particular functions of: current limitation; overvoltage detection; timing; discharge current threshold detection; and regulation of the discharge current by varying the flow rate of ionizable gas (thermostriction). The invention makes it possible in particular to conserve all of these functions while maintaining the possibility of switching over operation with one or the other of the cathodes 140A and 140B of the SPTs 111A and 111B.

As can be seen in FIG. 3, the cathode 140A of the SPT 111A is permanently connected to the cathode 140B of the SPT 111B by a line 191. The heater element 142B of the cathode 140B and the initiator electrode 144B of the cathode 140B are likewise connected via respective lines 193, 192 and the switch unit 170N in selective manner respectively to the heater and initiator modules 224 and 223. Thus, in the normal situation shown in FIG. 3, the heater module 224 is connected to the heater element of the cathode 140A, and the initiator module 223 is connected to the initiator electrode of the cathode 140A, but in the event of failure of the cathode 140A, the switch unit 170N enables the modules 224 and 223 to be switched over respectively to the heater element 142B of the cathode 140B via the line 193 and to the initiator electrode 144B of the cathode 140B via the line 192, thus enabling the cathode 140B, which is connected to the cathode 140A, to operate. The initiator electrodes 144A, 144B are essential, whereas the heater elements 142A, 142B are useful, but optional.

In FIG. 3, the switch unit 170S is shown in its normal operating position for powering an SPT of the south control channel (not shown), i.e. the normal SPT 111A of the north control channel is powered via the north control channel of the switch unit 170N and the redundant SPT 111B of the north control channel is not in service, but is ready to be put into service via the north control channel of the switch unit 170N in the event of failure of the SPT 111A, merely by switching first switches 227, 228 placed at the outputs from the modules 223 and 224. Nevertheless, in the event of failure of the circuits of the PPU 160N, the circuits of the north control channel of the PPU 160S, the switch unit 170S, and the electrical filter 190B can be used for powering the SPT 111B.

With reference to FIGS. 4 to 9, there follows a description of three possible embodiments of the fluid flow and electrical architectures of the gas flow rate control devices 180A and 180B.

Figure 4:
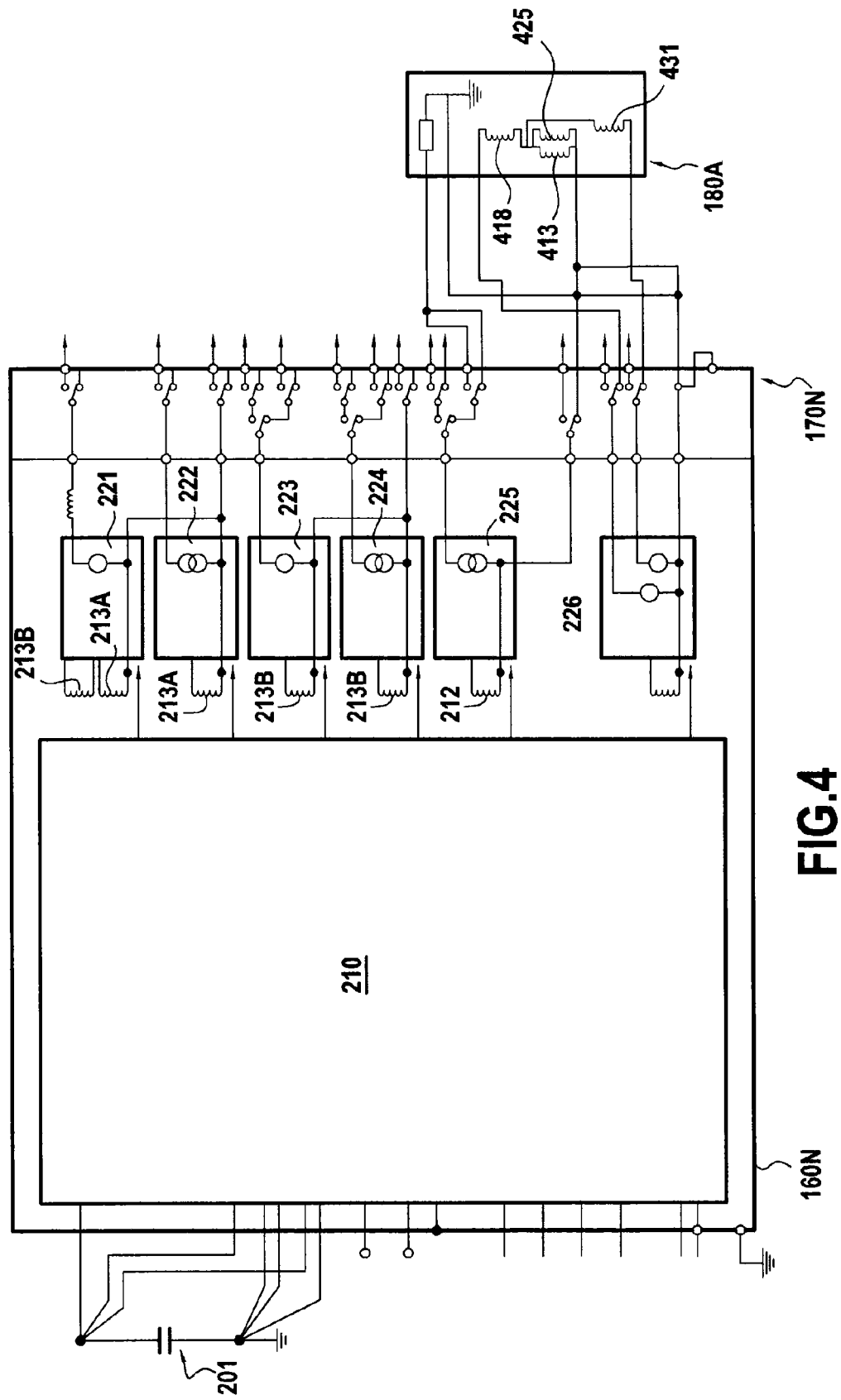
FIGS. 4 and 5 are electrical and fluid circuit diagrams of a first embodiment of the circuit for controlling the flow rate of the ionizable gas feed to the single-cathode stationary plasma thrusters of the electric propulsion system of the invention.
Figure 5:
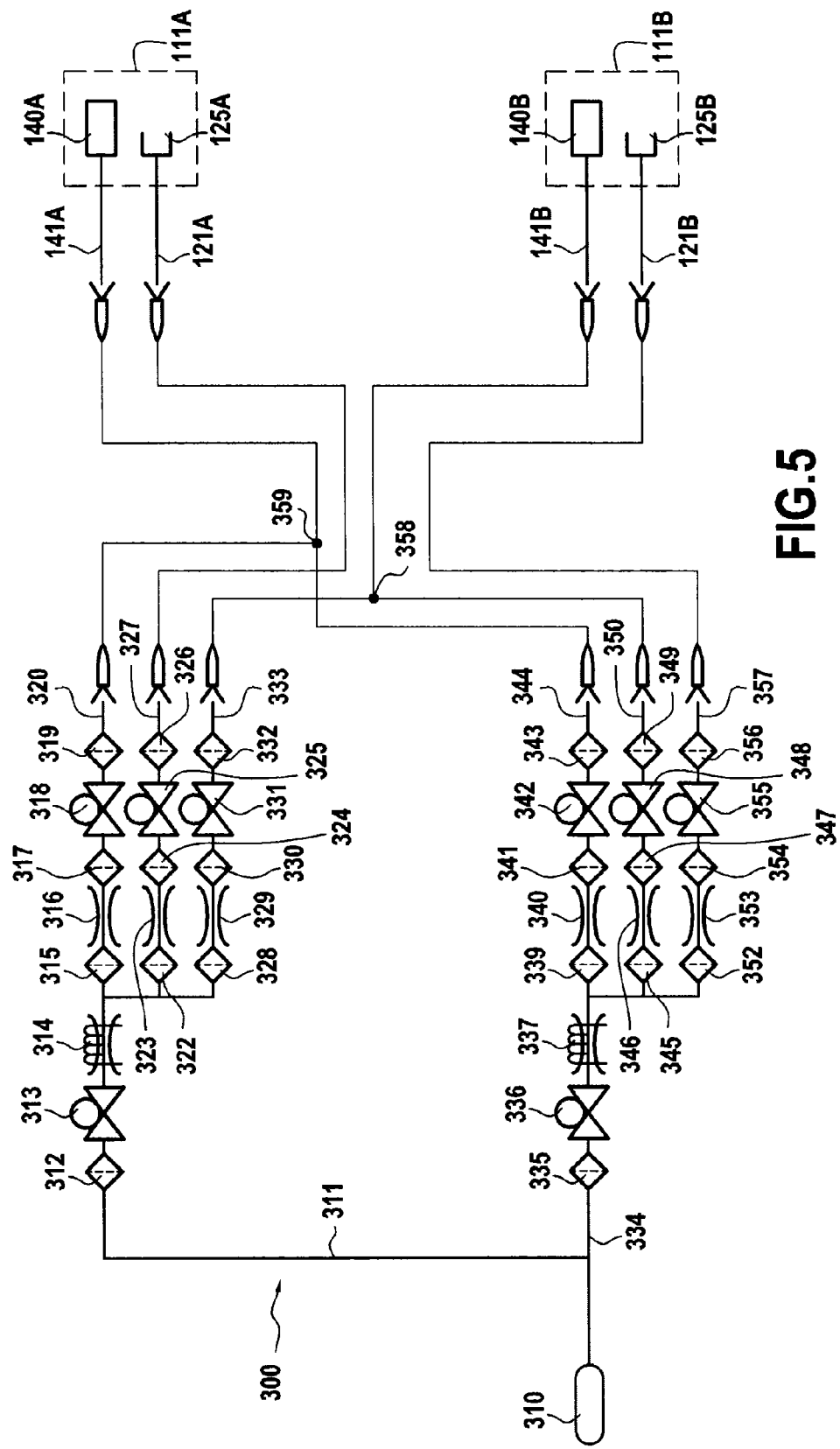
Figure 6:
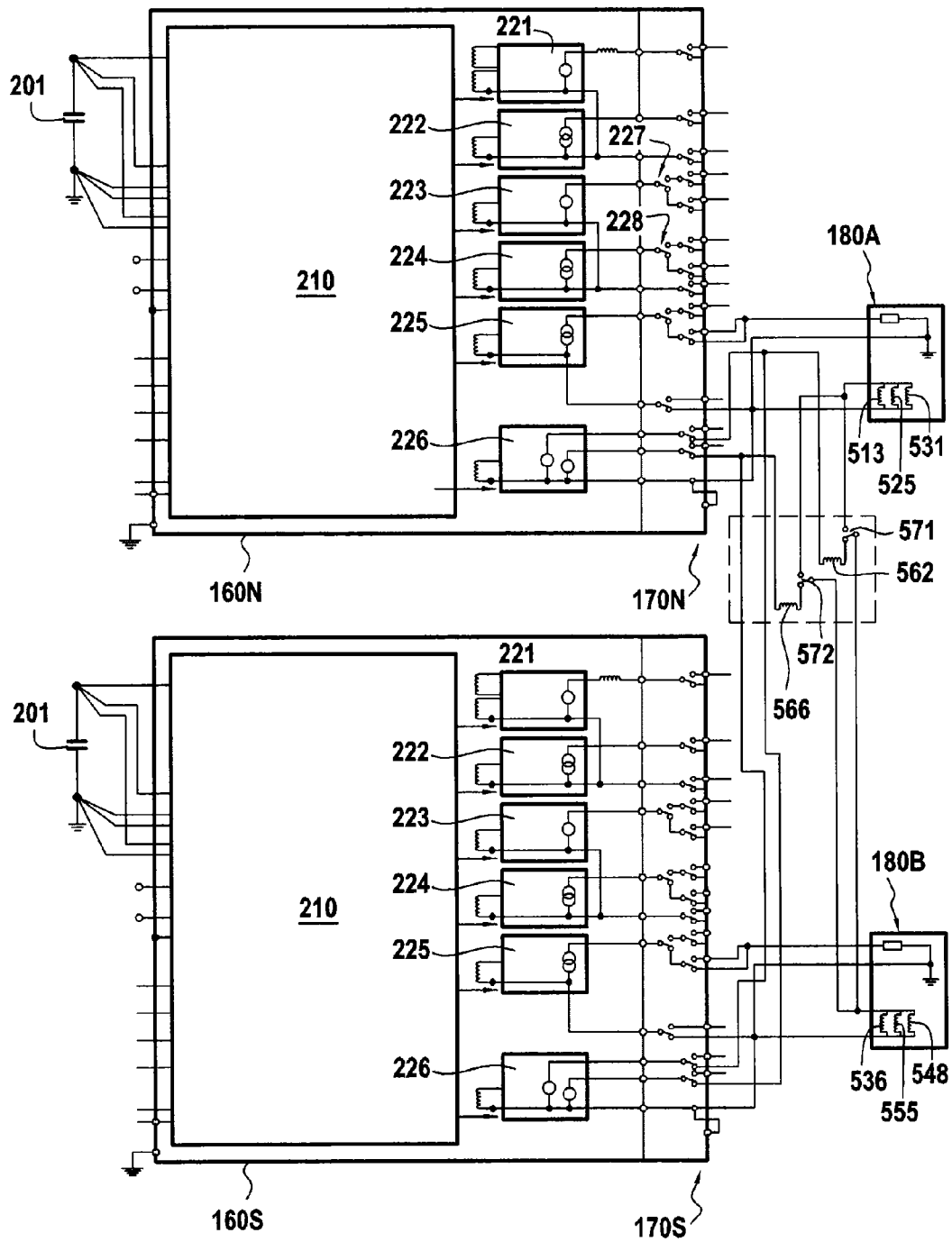
FIGS. 6 and 7 are electrical and fluid circuit diagrams of a second embodiment of the circuit for controlling the flow rate of the ionizable gas feed to the single-cathode stationary plasma thrusters of the electric propulsion system of the invention.
Figure 7:
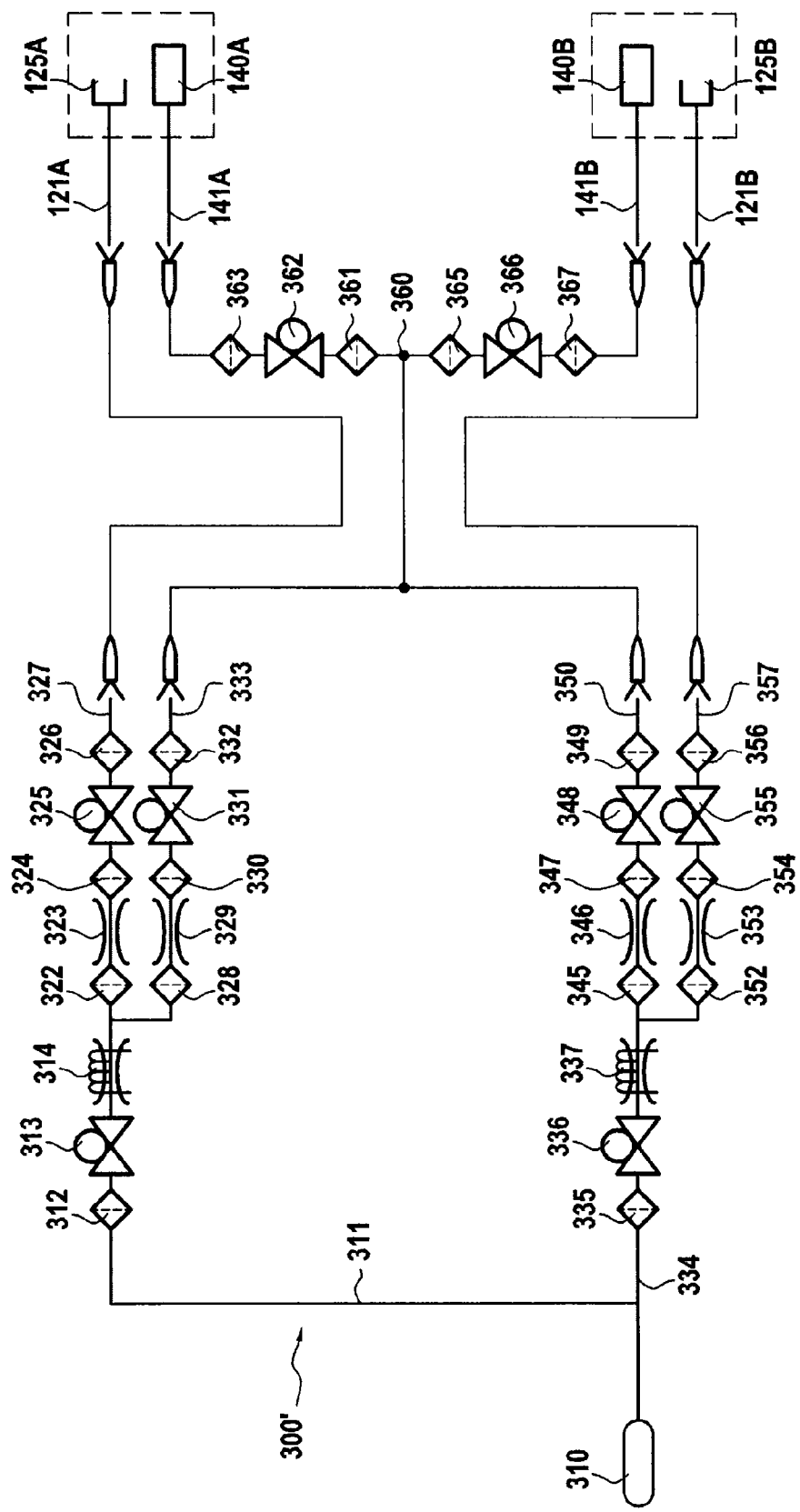
Figure 8:
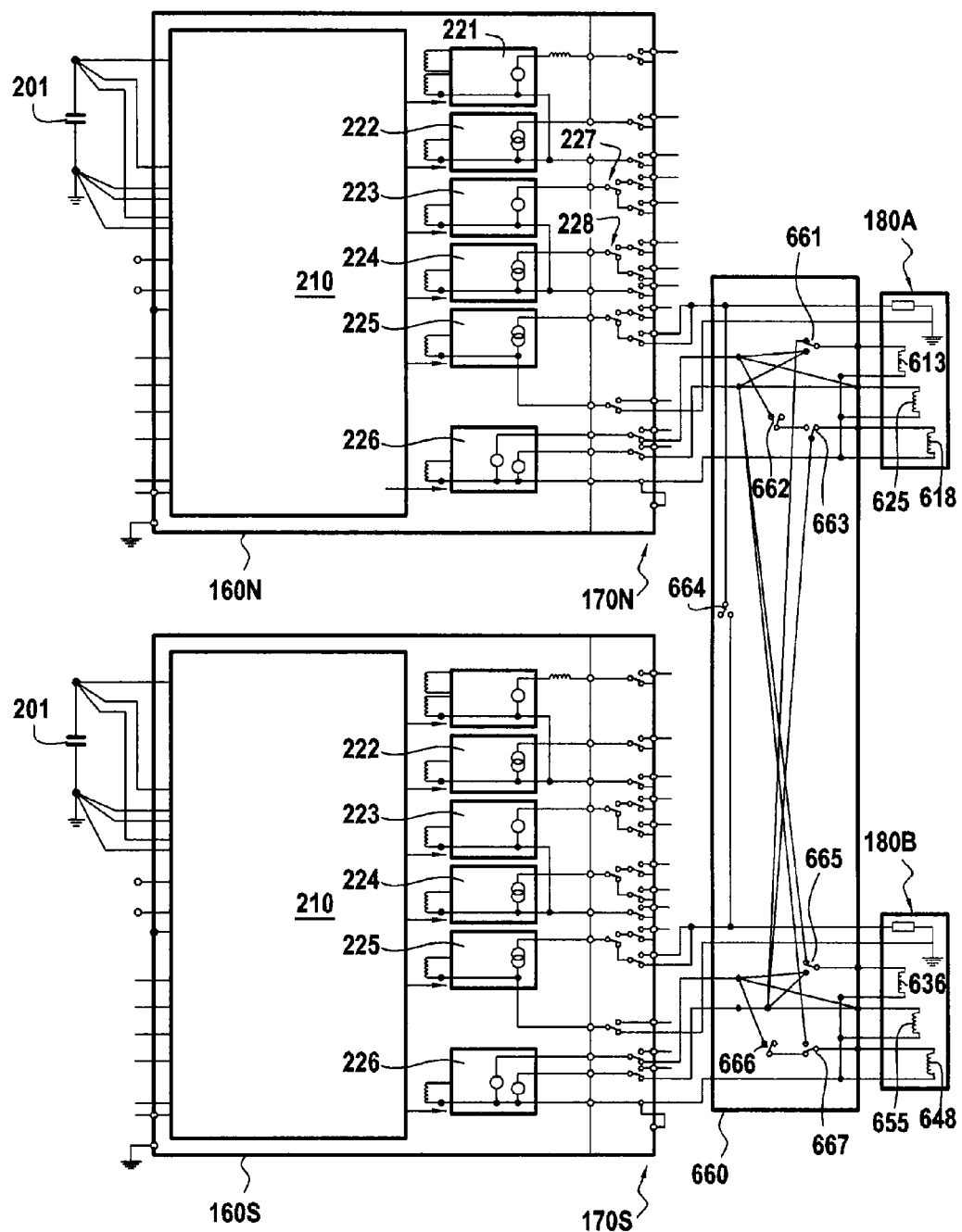
FIGS. 8 and 9 are electrical and fluid circuit diagrams of a third embodiment of the circuit for controlling the flow rate of the ionizable gas feed to the single-cathode stationary plasma thrusters of the electric propulsion system of the invention.
Figure 9:
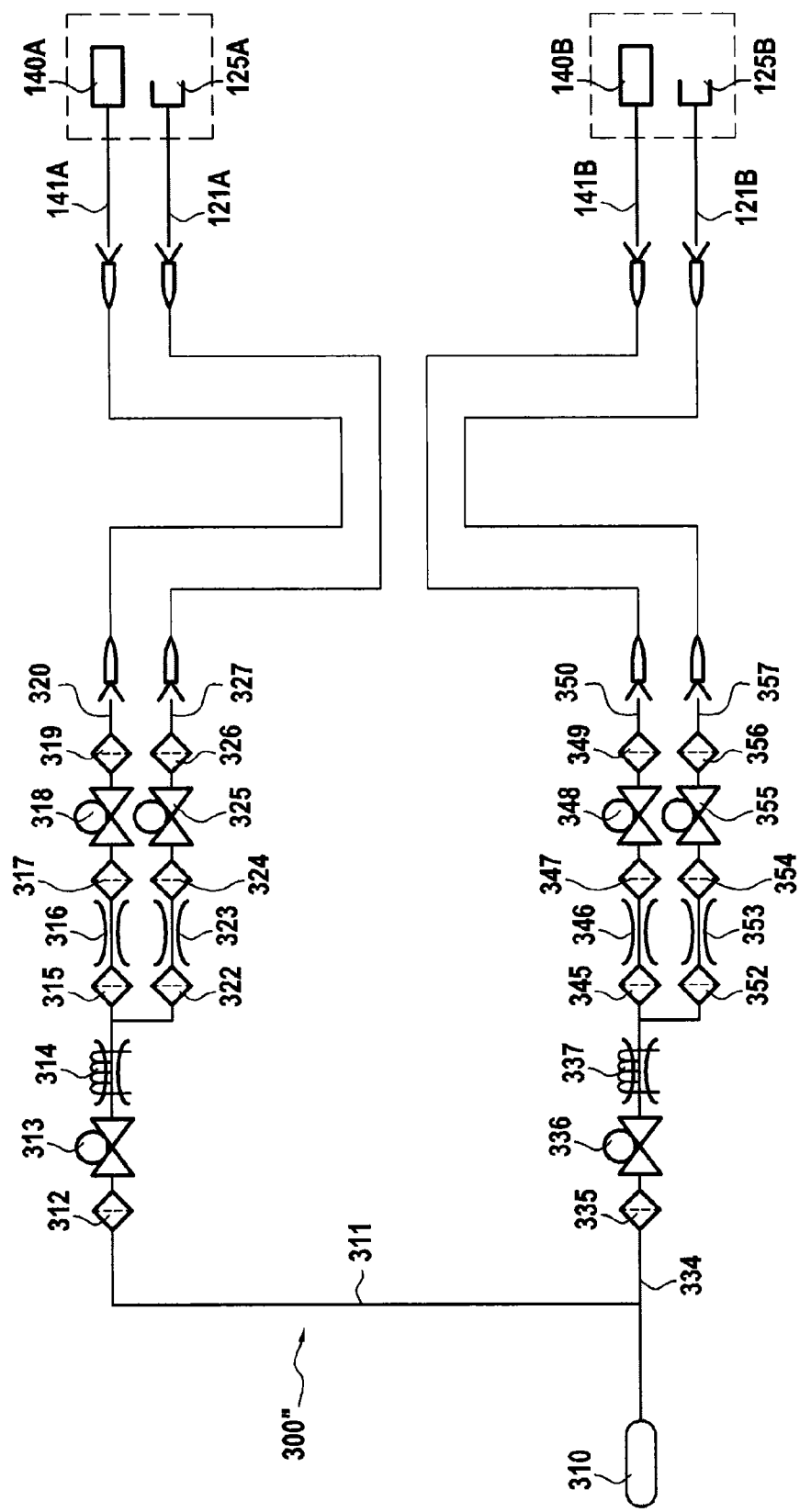

FIGS. 4, 6, and 8 show the electrical portions of the gas flow rate control devices 180A and 180B, while FIGS. 5, 7, and 9 show the common fluid flow device 300, 300', 300" of these devices with the various elements used between an outlet 310 of a gas regulator device connected to a tank and the elements in the SPTs 111A and 111B for receiving ionizable gas, i.e. respectively a gas manifold associated with an electrode 125A, 125B in a discharge channel 124A, 124B, and a cathode 140A, 140B.

In the embodiment shown in FIGS. 4 and 5, the common fluid flow device 300 shown in FIG. 5 has a first branch 311 with a first controlled inlet valve 313, a first thermostriction element 314, and a first set of three secondary branches 320, 327, and 333, each having a respective controlled valve 318, 325, and 331 and connected respectively to the first cathode 140A, to the first anode 125A, and to the second cathode 140B via lines 141A, 121A, and 141B, and a second branch 334 with a second controlled inlet valve 336, a second thermostriction element 337, and a second set of three secondary branches 344, 350, and 357, each having a respective controlled valve 342, 348, and 355 and respectively connected to the first cathode 140A, to the second cathode 140B, and to the second anode 125B via the lines 141A, 141B, and 121B.

Filters 312, 315, 317, 319, 322, 324, 326, 328, 330, 332, 335, 339, 341, 343, 345, 347, 349, 352, 354, and 356 may be associated with the various solenoid valves 313, 316, 325, 331, 336, 342, 348, and 355. Flow rate reducers 316, 323, 329, 340, 346, and 353 are preferably associated with the solenoid valves 318, 325, 331, 342, 348, and 355. Flexible hoses may be interposed between the branches 327 and 357 and also between the lines 121A and 121B. Flexible hoses may also be interposed between the line 141A and the lines 320 and 344 that are united at a point 359. Flexible hoses may also be interposed between the line 141B and the lines 333 and 350 that are united at a point 358.

A first gas flow rate control device 180A shown in FIG. 4 has coils 413, 425 connected in parallel for simultaneously controlling the first controlled inlet valve 313 and the controlled valve 325 of the secondary branch 327 connected to the first anode 1252A. The coils 418, 431 for controlling the respective controlled valves 318, 331 of the secondary branches 320, 333 are connected in series with the parallel connection of the coils 413 and 425, with one or the other of the valves 318, 331 being open at any given instant.

The second gas flow rate control device 180B, not shown in FIG. 4 but similar to the device 180A and co-operating with the PPU 160N, has coils connected in parallel to control simultaneously the second controlled inlet valve 336 and the controlled valve 355 of the secondary branch 357 connected to the second anode 125B. Coils for controlling the respective controlled valves 342, 348 of the secondary branches 344, 350 are connected in series with the above-mentioned parallel connection, one or other of the valves 342, 348 being open at any given instant.

In the embodiment of FIGS. 4 and 5, the gas flow rate control devices 180A, 180B that comprise four solenoid valves are particularly easy to provide with simplified cabling.

In the embodiment of FIGS. 6 and 7, the common fluid flow device 300' has a first branch 311 with a first controlled inlet valve 313, a first thermostriction element 314, and a first set of first and second secondary branches 327, 333 each having a respective controlled valve 325, 331. The first secondary branch 327 is connected by a line 121A to the first anode 125A, and the second secondary branch 333 is connected to a node 360, itself connected firstly via a first additional controlled valve 362 to the power supply line 141A for the first cathode 140A, and secondly via a second additional controlled valve 366 to the power supply line 141B for the second cathode 140B.

The common fluid flow device 300' has a second branch 334 with a second controlled inlet valve 336, a second thermostriction element 337, and a second set of first and second secondary branches 357, 350, each having a respective controlled valve 355, 348. The first secondary branch 357 is connected to the power supply line 121B for the second anode 125B, and the second secondary branch 350 is connected, like the branch 333, to the common node 360, which is itself connected firstly via the first additional controlled valve 362 to the power supply line 141A for the first cathode 140A, and secondly via the second additional controlled valve 366 to the power supply line 141B for the second cathode 140B.

As in the embodiment of FIGS. 4 and 5, flow rate reducers 323, 329, 346, and 353 are advantageously associated with the respective valves 325, 331, 348, and 355, and filters 313, 322, 324, 328, 330, 332, 335, 345, 347, 349, 352, 354, 356, 361, 363, 365, and 367 are associated with the various solenoid valves.

The first gas flow rate control device 180A, which is connected to the PPU 160N via the switch unit 170N, comprises coils 513, 525, and 531 connected in parallel for simultaneous controlling the first controlled inlet valve 313, the controlled valve 325 of the first secondary branch 327 of the first branch 311, and the valve 331 of the second secondary branch 333 of the first branch 311.

The second gas flow rate control device 180B, which is connected to the PPU 160S via the switch unit 170S, comprises coils 536, 555, and 548 connected in parallel for simultaneously controlling the second controlled inlet valve 336, the controlled valve 355 of the first secondary branch 357 of the second branch 334, and the controlled valve 348 of the second secondary branch 350 of the second branch 334.

The first and second gas flow rate control devices 180A, 180B also have in common coils 562, 566 for controlling the first and second additional controlled valves 363, 366. A small number of components such as electric switches or relays 571, 572 are associated with the coils 562, 566 to connect them to the PPU 160N. The embodiment of FIGS. 6 and 7 also constitutes an architecture that is simplified relative to full redundancy, providing the parallel connected unit containing the coils 562, 566 and the components 571, 572 can be simple in configuration.

In the embodiment of FIGS. 8 and 9, the common fluid flow device 300" has a first branch 311 with a first controlled inlet valve 313, a first thermostriction element 314, and a first set of two secondary branches 320, 327, each having a respective controlled valve 318, 325 and connected respectively to the power supply line 141A for the first cathode 140A and to the power supply line 121A for the gas manifold of the first anode 125A. The common fluid flow device 300" also has a second branch 334 with a second controlled inlet valve 336, a second thermostriction element 337, and a second set of two secondary branches 350, 357, each having a respective controlled valve 348, 355, and respectively connected to the power supply line 141B for the second cathode 140B and to the power supply line 121B for the second anode 125B.

The first gas flow rate control device 180A has coils 613, 625, and 618 respectively for controlling the first controlled inlet valve 313 and the valves 318 and 325 respectively of the first set of two secondary branches 320, 327.

The second gas flow rate control device 180B has coils 636, 648, and 655 respectively for controlling the second controlled inlet valve 336 and the controlled valves 348, 355 respectively of the second set of two secondary branches 350, 357.

The first and second gas flow rate control devices 180A, 180B are connected respectively via the switch units 170N, 170S to the PPUs 160N, 160S. Nevertheless, a switch module 660 having a small number of components, such as electrical switches or relays 661 to 667 is interposed between the switch units 170N, 170S and the first and second gas flow rate control devices 180A, 180B so as to make operation in crossed mode possible, i.e. with the anode of one SPT and the cathode of another SPT that is juxtaposed.

By means of the switch module 660, it is possible to control the thermostriction elements 314, 337 and their associated valves 313, 318, 325 and 336, 348, 355 respectively in separate manner, thus making it possible to obtain the following control modes:

a) Powering the coils 613, 625, and 618 to open the valves 313, 318, and 325, and applying the thermostriction 314, i.e. using the first anode 125A and the first cathode 140A (connection via the switches 661, 662, and 663).

b) Powering the coils 613, 625, 636, and 648, to open the valves 313, 325, 336, and 348, and applying thermostrictions 314 and 337 that are powered electrically in parallel, i.e. using the first anode 125A and the second cathode 140B (connections via the switches 664, 665, and 667).

c) Powering the coils 636, 648, and 655, to open the valves 336, 348, and 355, and applying the thermostriction 337, i.e. using the second anode 125B and the second cathode 140B (connections via the switches 665, 666, and 667).

d) Powering the coils 636, 655, 613, and 618, to open the valves 336, 355, 313, and 318, and applying the thermostrictions 314 and 337 that are electrically powered in parallel, i.e. using the second anode 125B and the first cathode 140A (connections via the switches 664, 661, 663, and 665).

The structure of the embodiment of FIGS. 8 and 9 is likewise easy to provide and involves a minimum of components. Under such circumstances, when using a crossed mode of operation, it merely happens that the cathode operates while consuming a small excess amount of gas, since each thermostriction element 314, 337 is in service with only one secondary branch 320 or 327, or respectively 350 or 357.

The invention claimed is:

1. An electric propulsion system with stationary plasma thrusters, the electric propulsion system comprising:
   first and second power processor units;
   first and second external thruster switch units;
   first and second electrical filters; and
   first and second stationary plasma thrusters;
   the first stationary plasma thruster comprising a first ionization channel, a single first cathode arranged in a vicinity of an outlet from the first ionization channel, a first anode associated with the first ionization channel, and a first gas manifold; and
   the second stationary plasma thruster comprising a second ionization channel, a single second cathode arranged in a vicinity of an outlet from the second ionization channel, a second anode associated with the second ionization channel, and a second gas manifold; and
   a line electrically connecting the first and second cathodes;
   first and second gas flow rate control devices associated respectively with each of the first and second stationary plasma thrusters, with a common fluid flow device for feeding gas to the first and second anodes and to the first and second cathodes,
   wherein the first and second power processor units selectively control activation at any given instant of only one of the first and second cathodes in co-operation with one of the first and second anodes.

2. The electric propulsion system according to claim 1, wherein the common fluid flow device comprises: a first branch comprising: a first controlled inlet valve; a first thermostriction element; and a first set of three secondary branches, each having a respective controlled valve and connected respectively to the first cathode, to the first anode, and to the second cathode; and a second branch comprising: a second controlled inlet valve; a second thermostriction element; and a second set of three secondary branches, each having a respective controlled valve, and connected respectively to the first cathode, to the second cathode, and to the second anode.

3. The electric propulsion system according to claim 2, wherein the first gas flow rate control device comprises coils for controlling the first controlled inlet valve, and selective controls for controlling respective controlled valves of the first set of three secondary branches, and wherein the second gas flow rate control device comprises coils for controlling the second controlled inlet valve, and selective controls for controlling respective controlled valves of the second set of three secondary branches.

4. The electric propulsion system according to claim 1, wherein the common fluid flow device comprises:
   a first branch comprising:
   a first controlled inlet valve;
   a first thermostriction element; and
   a first set of first and second secondary branches, each having a respective controlled valve, the first secondary branch being connected to the first anode and the second secondary branch being connected firstly to the first cathode via a first additional controlled valve and secondly to the second cathode via a second additional controlled valve; and
   a second branch comprising:
   a second controlled inlet valve;
   a second thermostriction element; and
   a second set of first and second secondary branches, each having a respective controlled valve, the first secondary branch being connected to the second anode, and the second secondary branch being connected firstly to the first cathode via the first additional controlled valve and secondly to the second cathode via the second additional controlled valve.

5. The electric propulsion system according to claim 4, wherein the first gas flow rate control device comprises coils connected in parallel for simultaneously controlling the first controlled inlet valve, the controlled valve of the first secondary branch of the first branch, and the valve of the second secondary branch of the first branch, wherein the second gas flow rate control device comprises coils connected in parallel for simultaneously controlling the second controlled inlet valve, the controlled valve of the first secondary branch of the second branch, and the controlled valve of the second secondary branch of the second branch, and wherein the first and second gas flow rate control devices also have in common control coils for controlling the first and second additional controlled valves, one or the other of the first and second additional controlled valves being open at any given instant.

6. The electric propulsion system according to claim 1, wherein the common fluid flow device comprises:
   a first branch comprising:
   a first controlled inlet valve;
   a first thermostriction element; and a first set of two secondary branches, each having a respective controlled valve and connected respectively to the first cathode and to the first anode; and a second branch comprising:
a second controlled inlet valve;
a second thermostriction element; and
a second set of two secondary branches, each having a respective controlled valve and connected respectively to the second cathode and to the second anode.

7. The electric propulsion system according to claim 6, wherein the first gas flow rate control device comprises coils for respectively controlling the first controlled inlet valve and the respective controlled valves of the first set of two secondary branches, wherein the second gas flow rate control device comprises coils for respectively controlling the second controlled inlet valve and the respective controlled valves of the second set of two secondary branches, and wherein the first and second gas flow rate control devices are associated with a switch module for selectively controlling the power supply to the coils.

8. The electric propulsion system according to claim 1, wherein the common fluid flow device comprises at least one controlled valve and at least one filter is associated with each controlled valve.

9. The electric propulsion system according to claim 1, further comprising third and fourth juxtaposed stationary plasma thrusters cooperating with at least one device for regulated delivery of gas under high pressure, the first and second power processor units, the first and second switch units, and the first and second electrical filters.

10. An electric propulsion system with stationary plasma thrusters, the electric propulsion system comprising:
first and second power processor units;
first and second external thruster switch units;
first and second electrical filters; and
first and second stationary plasma thrusters;
the first stationary plasma thruster comprising a first ionization channel a single first cathode arranged in a vicinity of an outlet from the first ionization channel, a first anode associated with the first ionization channel, and a first gas manifold; and
the second stationary plasma thruster comprising a second ionization channel, a single second cathode arranged in a vicinity of an outlet from the second ionization channel, a second anode associated with the second ionization channel, and a second gas manifold;
a line electrically connecting the first and second cathodes; and
first and second gas flow rate control devices associated respectively with each of the first and second stationary plasma thrusters, with a common fluid flow device for feeding gas to the first and second anodes and to the first and second cathodes,
wherein the first and second power processor units selectively control activation at any given instant of only one of the first and second cathodes in co-operation with one of the first and second anodes, and
wherein the common fluid flow device comprises:
a first branch comprising:
a first controlled inlet valve;
a first thermostriction element; and a first set of three secondary branches, each having a respective controlled valve and connected respectively to the first cathode, to the first anode, and to the second cathode; and
a second branch comprising:
a second controlled inlet valve;
a second thermostriction element; and
a second set of three secondary branches, each having a respective controlled valve, and connected respectively to the first cathode, to the second cathode, and to the second anode.

11. The electric propulsion system according to claim 10, wherein the first gas flow rate control device comprises coils for controlling the first controlled inlet valve, and selective controls for controlling respective controlled valves of the first set of three secondary branches, and
wherein the second gas flow rate control device comprises coils for controlling the second controlled inlet valve, and selective controls for controlling respective controlled valves of the second set of three secondary branches.

12. The electric propulsion system according to claim 10, wherein at least one filter is associated with each controlled valve.

13. The electric propulsion system according to claim 10, further comprising third and fourth stationary plasma thrusters cooperating with the first and second power processor units, the first and second switch units, and the first and second electrical filters.

14. An electric propulsion system with stationary plasma thrusters, the electric propulsion system comprising:
first and second power processor units;
first and second external thruster switch units;
first and second electrical filters; and
first and second juxtaposed stationary plasma thrusters;
the first stationary plasma thruster comprising a first ionization channel, a single first cathode arranged in a vicinity of an outlet from the first ionization channel, a first anode associated with the first ionization channel, and a first gas manifold; and
the second stationary plasma thruster comprising a second ionization channel, a single second cathode arranged in a vicinity of an outlet from the second ionization channel, a second anode associated with the second ionization channel, and a second gas manifold;
a line electrically connecting the first and second cathodes; and
first and second gas flow rate control devices associated respectively with each of the first and second stationary plasma thrusters, with a common fluid flow device for feeding gas to the first and second anodes and to the first and second cathodes,
wherein the first and second power processor units selectively control activation at any given instant of only one of the first and second cathodes in co-operation with one of the first and second anodes, and
wherein the common fluid flow device comprises:
a first branch comprising:
a first controlled inlet valve;
a first thermostriction element; and
a first set of first and second secondary branches, each having a respective controlled valve, the first secondary branch being connected to the first anode and the second secondary branch being connected firstly to the first cathode via a first additional controlled valve and secondly to the second cathode via a second additional controlled valve; and
a second branch comprising:
a second controlled inlet valve;
a second themaostriction element; and
a second set of first and second secondary branches, each having a respective controlled valve, the first secondary branch being connected to the second anode, and the second secondary branch being connected firstly to the first cathode via the first additional controlled valve and secondly to the second cathode via the second additional controlled valve.

15. The electric propulsion system according to claim 14, wherein the first gas flow rate control device comprises coils connected in parallel for simultaneously controlling the first controlled inlet valve, the controlled valve of the first secondary branch of the first branch, and the valve of the second secondary branch of the first branch,
wherein the second gas flow rate control device comprises coils connected in parallel for simultaneously controlling the second controlled inlet valve, the controlled valve of the first secondary branch of the second branch, and the controlled valve of the second secondary branch of the second branch, and
wherein the first and second gas flow rate control devices also have in common control coils for controlling the first and second additional controlled valves, one or the other of the first and second additional controlled valves being open at any given instant.

16. The electric propulsion system according to claim 14, wherein at least one filter is associated with each controlled valve.

17. The electric propulsion system according to claim 14, further comprising third and fourth stationary plasma thrusters cooperating with the first and second power processor units, the first and second switch units, and the first and second electrical filters.

18. An electric propulsion system with stationary plasma thrusters, the electric propulsion system comprising:
first and second power processor units;
first and second external thruster switch units;
first and second electrical filters; and
first and second juxtaposed stationary plasma thrusters;
the first stationary plasma thruster comprising a first ionization channel, a single first cathode arranged in a vicinity of an outlet from the first ionization channel, a first anode associated with the first ionization channel, and a first gas manifold; and
the second stationary plasma thruster comprising a second ionization channel, a single second cathode arranged in a vicinity of an outlet from the second ionization channel, a second anode associated with the second ionization channel, and a second gas manifold;
a line electrically connecting the first and second cathodes; and
first and second gas flow rate control devices associated respectively with each of the first and second stationary plasma thrusters, with a common fluid flow device for feeding gas to the first and second anodes and to the first and second cathodes, wherein the first and second power processor units selectively control activation at any given instant of only one of the first and second cathodes in co-operation with one of the first and second anodes, and
wherein the common fluid flow device comprises:
a first branch comprising:
a first controlled inlet valve;
a first thermostriction element; and
a first set of two secondary branches, each having a respective controlled valve and connected respectively to the first cathode and to the first anode; and
a second branch comprising:
a second controlled inlet valve;
a second thermorestriction element; and
a second set of two secondary branches, each having a respective controlled valve and connected respectively to the second cathode and to the second anode.

19. The electric propulsion system according to claim 18, wherein the first gas flow rate control device comprises coils for respectively controlling the first controlled inlet valve and the respective controlled valves of the first set of two secondary branches,
wherein the second gas flow rate control device comprises coils for respectively controlling the second controlled inlet valve and the respective controlled valves of the second set of two secondary branches, and
wherein the first and second gas flow rate control devices are associated with a switch module for selectively controlling the power supply to the coils.

20. The electric propulsion system according to claim 18, wherein at least one filter is associated with each controlled valve.

21. The electric propulsion system according to claim 18, further comprising third and fourth stationary, plasma thrusters cooperating with the first and second power processor units, the first and second switch units, and the first and second electrical filters.

* * * * *